July 30, 1929.　　　J. A. MYERS　　　1,722,936

COFFEEPOT

Filed Feb. 20, 1929

WITNESSES
F. H. Taylor.

INVENTOR
John A. Myers.
BY
ATTORNEY

Patented July 30, 1929.

1,722,936

UNITED STATES PATENT OFFICE.

JOHN AUGUST MYERS, OF CLEVELAND, OHIO.

COFFEEPOT.

Application filed February 20, 1929. Serial No. 341,439.

My invention relates to improvements in water kettles and coffee pots and it consists in the constructions, arrangements and combination of parts herein described and claimed.

An object of my invention is to provide a kettle or coffee pot having heat conducting tubes so arranged as to transmit heat to the major portion of the body of water contained within the receptacle.

Another object of my invention is to construct a coffee pot or kettle having a heat transmitting tube so arranged as to prevent extinguishing a flame of a burner, in the event of boiling over of the liquid within the kettle.

Additional objects and advantages and features of invention will appear from the following description and the novel features will be particularly pointed out in the appended claims.

In the drawings forming a part of this application,

Figure 1:
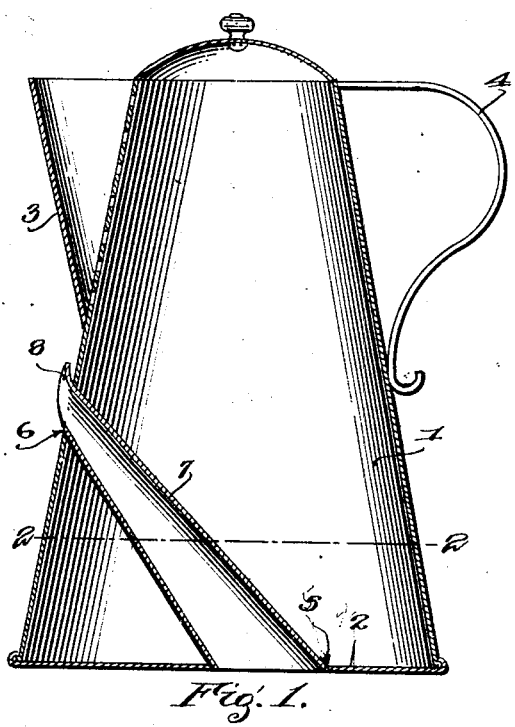
Figure 1 is a vertical section of a coffee pot illustrating my invention.

In carrying out my invention I provide a pot 1 which may be of any usual construction, having a bottom 2, pouring spout 3 and handle 4.

The bottom 2 has an opening 5 formed therein, and at a point immediately below the pouring spout 3 the wall of the pot has an opening 6. A heat transmitting tube 7 is provided, this tube preferably being of tapered formation, the large end being disposed within the opening 5, while the smaller end is positioned within the opening 6. The tube is preferably soldered for its retention. The tube 7 is of such length as to project slightly beyond the wall of the pot, the projecting end being turned upwardly to form a lip 8, the lip lying directly below the discharge spout 3.

In the use of the pot, heat from a burner will be directed upon the bottom 2, and will also be directed upwardly through the tube 7. It will thus be seen that by the provision of the tube 7, an increased heating area is provided, assuring a rapid heating of the fluid contained in the pot.

As is often the case in the boiling of fluids, a fluid will come to a boil and unless the flame of the burner is reduced, the fluid will be caused to overflow through the spout, issuing as a solid stream and in many cases, extinguishes the flame. In my device, however, when such boiling over occurs, the fluid emerges over the rim of the spout, flowing downwardly upon the side wall of the pot until it encounters the projecting lip 8. It will be seen that the lip 8 will divert the overflow stream upon opposite sides and thus protects the flame of the burner.

Figure 3:
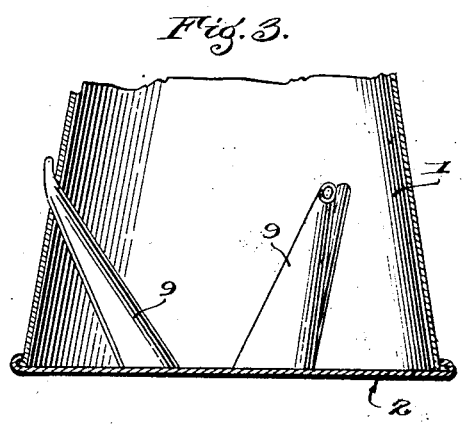
Fig. 3 is a fragmentary sectional view of a further form.
Figure 4:
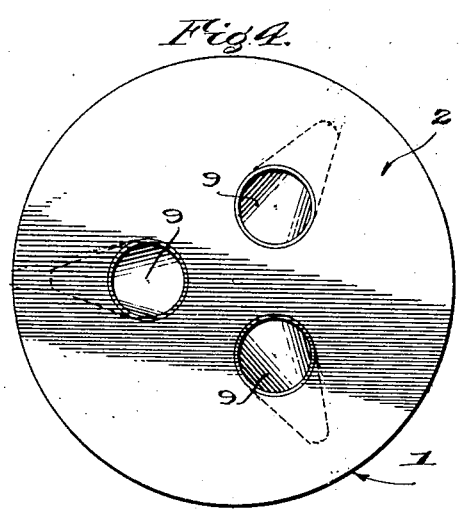
Fig. 4 is a bottom view thereof.
Figure 2:
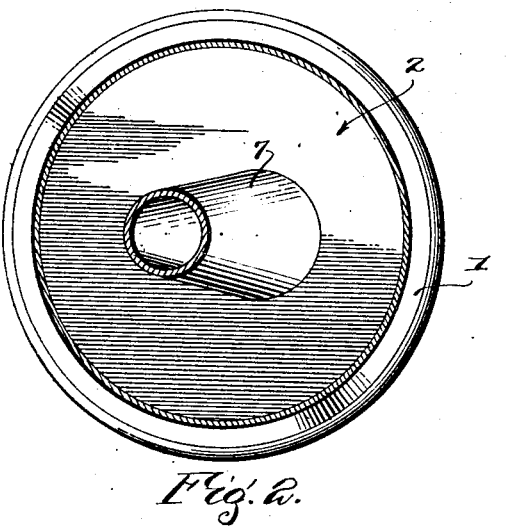
Fig. 2 is a cross section on the line 2—2 of Fig. 1.
Figure 5:
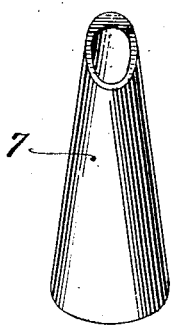
Fig. 5 is a detail perspective of the heat conducting tube illustrated in Fig. 1.

Reference is now made to Figs. 3 and 4, wherein it is shown that a plurality of heat conducting tubes 9 may be provided, these tubes extending from the bottom to the side walls of the pot as previously described. It will, of course, be understood that the provision of additional tubes will increase the heating area of a pot or kettle and I do not limit myself to any particular number of tubes, but it will, of course, be understood that at least one of these tubes must project outwardly of the pot or kettle, directly below the discharge spout, in order to divert the overflow.

I claim:

1. A kitchen receptacle comprising a kettle having a bottom and side walls, a discharge spout upon the side wall, said kettle having an opening in the bottom and an opening in said side wall, said last named opening being disposed beneath the discharge spout, a tube in registry with said openings, and said tube having a portion projecting through the opening in the side wall and directly below said discharge spout.

2. A kitchen receptacle comprising a kettle having bottom and side walls, a discharge spout upon the side wall, a heat conducting tube mounted in said bottom and projecting through the side wall and said tube having an upwardly turned lip member outwardly of said side wall and directly below said spout.

JOHN AUGUST MYERS.